(12) United States Patent
Cockerham et al.

(10) Patent No.: US 9,987,508 B2
(45) Date of Patent: Jun. 5, 2018

(54) HYBRID COMPOSITE FLAME CELL

(71) Applicant: Emerson Process Management Regulator Technologies Tulsa, LLC, Tulsa, OK (US)

(72) Inventors: John D. Cockerham, Tulsa, OK (US); James Myers, Tulsa, OK (US)

(73) Assignee: Emerson Process Management Regulator Technologies Tulsa, LLC, Tulsa, OK (US)

( * ) Notice: Subject to any disclaimer, the term of this patent is extended or adjusted under 35 U.S.C. 154(b) by 0 days. days.

(21) Appl. No.: 15/253,537

(22) Filed: Aug. 31, 2016

(65) Prior Publication Data

US 2018/0056101 A1 Mar. 1, 2018

(51) Int. Cl.
*A62C 4/02* (2006.01)
*B01D 46/00* (2006.01)
*B33Y 10/00* (2015.01)
*B33Y 80/00* (2015.01)

(52) U.S. Cl.
CPC ............ *A62C 4/02* (2013.01); *B01D 46/0001* (2013.01); *B33Y 10/00* (2014.12); *B33Y 80/00* (2014.12)

(58) Field of Classification Search
CPC .... A62C 4/02; A62C 4/00; A62C 2/04; A62C 2/00; B01D 46/0001; B01D 46/00; F23D 14/82; F23D 14/74; F23N 5/24; B65D 90/325; B65D 90/32; B65D 25/385
USPC ....... 220/88.2, 88.1; 169/48; 431/7, 114, 71, 431/346, 352, 170, 326, 328, 202
See application file for complete search history.

(56) References Cited

U.S. PATENT DOCUMENTS

| | | | |
|---|---|---|---|
| 258,749 A * | 5/1882 | Hall | A62C 4/00 220/88.2 |
| 1,259,029 A | 3/1918 | Lucke | |
| 2,420,599 A | 5/1947 | Jurs | |
| 3,650,431 A * | 3/1972 | Stewart | B60K 15/077 220/560.12 |
| 3,804,292 A * | 4/1974 | Chiti | B60K 15/03 137/264 |
| 5,145,360 A * | 9/1992 | Rajewski | A62C 4/02 220/88.2 |
| 5,211,554 A * | 5/1993 | Rajewski | A62C 4/02 220/88.2 |
| 5,415,233 A | 5/1995 | Roussakis et al. | |

(Continued)

FOREIGN PATENT DOCUMENTS

CN 1483491 A 3/2004
WO WO 2004/108219 A1 12/2004

OTHER PUBLICATIONS

Partial International Search Report for Application No. PCT/US2017/048329 dated Nov. 3, 2017.

(Continued)

*Primary Examiner* — Robert J Hicks
(74) *Attorney, Agent, or Firm* — Marshall, Gerstein & Borun LLP

(57) ABSTRACT

A flame cell of a flame arrestor may include a body of a first material having a first end, a second end, and a plurality of channels formed in the body and extending from the first end to the second end of the body. The flame cell may also include an element of a second material coupled to the body, the second material being different from the first material. The element may be configured to draw heat away from fluid flowing through the plurality of channels.

22 Claims, 17 Drawing Sheets

(56) References Cited

U.S. PATENT DOCUMENTS

| | | | |
|---|---|---|---|
| 6,699,035 B2 * | 3/2004 | Brooker | A62C 4/02 220/88.2 |
| 7,918,664 B2 | 4/2011 | Leinemann | |
| 2003/0031966 A1 * | 2/2003 | Berry | F23C 13/00 431/7 |
| 2003/0165638 A1 * | 9/2003 | Louks | B01D 39/2068 427/600 |
| 2009/0277655 A1 * | 11/2009 | DeCourcy | B01J 8/06 169/45 |
| 2010/0147857 A1 * | 6/2010 | Huang | B65D 88/76 220/560.03 |
| 2012/0273239 A1 | 11/2012 | Brennan | |

OTHER PUBLICATIONS

International Search Report and Written Opinion, corresponding International Application No. PCT/US2017/048329, dated Jan. 29, 2018.

* cited by examiner

A-A

HYBRID COMPOSITE FLAME CELL

FIELD OF DISCLOSURE

The present disclosure generally relates to flame cells, and, more particularly, to a method of manufacturing a flame cell made of at least two different materials.

BACKGROUND OF THE DISCLOSURE

Flame arrestors can be employed in applications, e.g., chemical, refining, petrochemical, upstream oil and gas, landfill, biogas applications, and the like, involving flammable vapors so as to prevent the flammable vapors from being ignited by potential ignition sources (e.g., flares, flames, exothermic chemical reactions, failed compressor bearings, etc.), which could lead to a fire, a deflagration, and/or a detonation. Flame arrestors, which may, for example, be installed in a pipeline between a fuel source (e.g., one or more storage tanks) and an ignition source (e.g., a flare, a flame), include flow paths that facilitate fluid flow therethrough, but, at the same time, remove heat from a flame front (which may also be referred to as the flame) as it attempts to flow through these flow paths. Flame arrestors thus prevent the flame front from reaching the fuel source, thereby preventing ignition of the fuel source, and, in turn, injuries, environmental issues, and/or damage to equipment and facilities that may result from such an ignition.

With conventional manufacturing processes, flame arrestors, such as the flame arrestor 100 of an element assembly shown in FIGS. 1A and 1B, include one or more flame cells 104 that are installed (e.g., welded, captured by welded rings or crossbars) in the housing 108 and feature a plurality of narrow, linear flame paths 112 that serve to remove heat from a flame front that attempts to flow therethrough, as described above. As best illustrated in FIG. 1B, each of the flame cells 104 employs multiple layers 116 of crimped metal ribbons that are wound around a core 120 and define or create a plurality of triangularly-shaped openings 124, which in turn define or create the linear flame paths 112. In some cases, e.g., when the flame arrestor 100 includes multiple flame cells 104, as is the case in FIGS. 1A and 1B (which depicts four flame cells 104), a sheet of expanded metal or a screen 128 must be installed within the housing 104 between each pair of adjacent flame cells 104 so as to create a level of turbulence that ensures adequate heat removal as the flame front travels through the flame arrestor 100.

SUMMARY

In accordance with a first exemplary aspect of the present invention, a flame arrestor is provided. The flame arrestor may include a housing adapted to be disposed within a fluid passageway. The housing may have an inlet, an outlet, and a fluid flow path connecting the inlet and the outlet. The flamer arrestor may include a flame cell disposed within the fluid flow path of the housing. The flame cell may include a body of a first material having a first end, a second end, an exterior surface, and an interior core. The interior core may have a plurality of channels extending from the first end to the second end of the body. The flame cell may include an element of a second material disposed adjacent to the body. The second material may be different from the first material and the element may be configured to draw heat away from fluid flowing through the plurality of channels.

In accordance with a second exemplary aspect of the present invention, a flame cell of a flame arrestor is provided. The flame cell may include a body of a first material having a first end, a second end, and a plurality of channels formed in the body and extending from the first end to the second end of the body. The flame cell may also include an element of a second material coupled to the body, the second material being different from the first material. The element may be configured to draw heat away from fluid flowing through the plurality of channels.

In accordance with a third exemplary aspect of the present invention, a method custom manufacturing a flame arrestor is provided. The method may include providing a housing having an interior surface and an exterior surface. The exterior surface of the housing may be shaped to fit within a fluid passageway. The method may also include forming, using an additive manufacturing technique, a three-dimensional lattice structure by depositing a first material onto the interior surface of the housing in a predetermined pattern. The lattice structure may include a plurality of connected lattice members forming channels extending from a first end to a second end of the three-dimensional lattice structure. Further, the method may include providing an element of a second material adjacent to the three-dimensional lattice structure. The second material may be different than the first material and the element may be configured to draw heat away from fluid flowing through the plurality of channels.

In accordance with a fourth exemplary aspect of the present invention, a method of manufacturing a flame cell of a flame arrestor may be provided. The method may include forming, using an additive manufacturing technique, a three-dimensional lattice structure of a first material. The three-dimensional lattice structure may include a plurality of connected lattice members defining a plurality of channels extending from a first end of the three-dimensional lattice structure to a second end of the three-dimensional lattice structure. The method may further include providing an element extending from the first end of the three-dimensional lattice structure to the second end of the three-dimensional lattice structure. The element may be a second material that is different than the first material. Further, the method may include coupling the element to the three-dimensional lattice structure. The element may be configured to draw heat away from fluid flowing through the plurality of channels.

In further accordance with any one or more of the foregoing first, second, third, and fourth exemplary aspects, a flame cell, a flame arrestor, a method of manufacturing a flame arrestor, and/or a method of manufacturing a flame cell may include any one or more of the following further preferred forms.

In one preferred form, a slot may be formed within the interior core of the body. The element may be an insert disposed within the slot of the interior core.

In another preferred form, the body may further include a plurality of layers of the first material defining a lattice structure. The element may be disposed on one of the plurality of layers such that the one of the plurality of layers is disposed adjacent to the second material.

In another preferred form, the element may be integrally formed with the body.

In another preferred form, the body may further include a plurality of layers of the first material defining a lattice structure. The lattice structure of the body may be integrally formed with the element by an additive manufacturing technique.

In another preferred form, the body and the housing may be integrally formed of the first material.

In another preferred form, a plurality of slots may be formed in the body. Each of the plurality of slots may include an end located within the interior core of the body. The element may include a plurality of inserts where each insert has a first end disposed within the end of the slot and a second end located outside the exterior surface of the body.

In another preferred embodiment, the element may be coupled to the body by depositing a layer of the second material onto a layer of the first material.

In another preferred embodiment, a slot may be formed in the body and sized to receive the element. The element may be coupled to the body by inserting the element into the slot.

In another preferred form, the step of forming the three-dimensional lattice structure further includes forming a cavity within the three-dimensional lattice structure. The step of providing the element of the second material may include inserting the element into the cavity.

In another preferred form, the step of forming the three-dimensional lattice structure may include forming a slot in the three-dimensional lattice structure. The step of providing the element may include inserting the element within the slot so that the element extends through the exterior surface of the housing.

In another preferred form, the step of forming the three-dimensional lattice structure may include forming a plurality of slots in the three-dimensional lattice structure. The step of providing the element may include forming a plurality of inserts and placing each of the plurality of inserts into a respective one of the plurality of slots. Each of the inserts may extend through the exterior surface of the housing.

In another preferred form, the step of providing the housing may include forming the housing by the additive manufacturing technique using a third material that is different than the first material.

In another preferred form, the step of providing the housing may include integrally forming the housing and the three-dimensional lattice structure of the first material by the additive manufacturing technique.

In another preferred form, the step of forming the three-dimensional lattice structure may include forming a cavity within the three-dimensional lattice structure. The step of coupling the element may include inserting the element into the cavity of the three-dimensional lattice structure.

In another preferred form, the step of forming the three-dimensional lattice structure includes forming a plurality of slots in the three-dimensional lattice structure, wherein each one of the plurality of slots extends from the first end to the second end of the three-dimensional lattice structure. The step of providing the element may include forming a plurality of inserts, using the additive manufacturing technique, and the step of coupling the element includes depositing the plurality of inserts into a respective one of the plurality of slots.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several FIGS., in which:

DETAILED DESCRIPTION

The present disclosure is generally directed to a method of manufacturing a flame arrestor that removes heat from a flame front in a more efficient manner and requires less maintenance than conventionally manufactured flame arrestors such as the flame arrestor 100. The method described herein utilizes cutting edge manufacturing techniques, like additive manufacturing, to facilitate custom manufacturing of the flame arrestor, as well as various components of the flame arrestor (e.g., one or more flame cells), such that a number of different unique and complex flow paths, e.g., non-linear flow paths, can be developed and incorporated into the resulting flame arrestor in place of the standard, linear flow paths utilized in conventional flame arrestors, depending upon the given application. Unique and complex flow paths promote or induce turbulent flow and encourage nearly continuous (or at least increased) heat transfer from a flame front to the flame arrestor, such that flame arrestors produced according to the method of manufacturing described herein represent an improvement over known flame arrestors.

Beneficially, these unique and complex flow paths also obviate the need for screens or expanded metal, which are sometimes needed in conventional flame arrestors to promote turbulent flow but undesirably result in a large pressure drop across the flame arrestor and may, in some cases, plug the flame cells. In other words, the method described herein can yield a flame arrestor that induces a greater level of turbulent flow than conventional flame arrestors, without producing the negative effects (i.e., a large pressure drop and increased maintenance due to plugging) caused by turbulence inducing screens or expanded metal. In some cases, the method described herein may also reduce the number of flame cells that need to be utilized in a given flame arrestor, such that less material is required, thereby reducing the weight and/or manufacturing cost of the flame arrestor. This also has the potential benefit of facilitating a shorter flame arrestor (as less flame cells are used), which will in turn reduce pressure drops within the flame arrestor.

Figure 2:
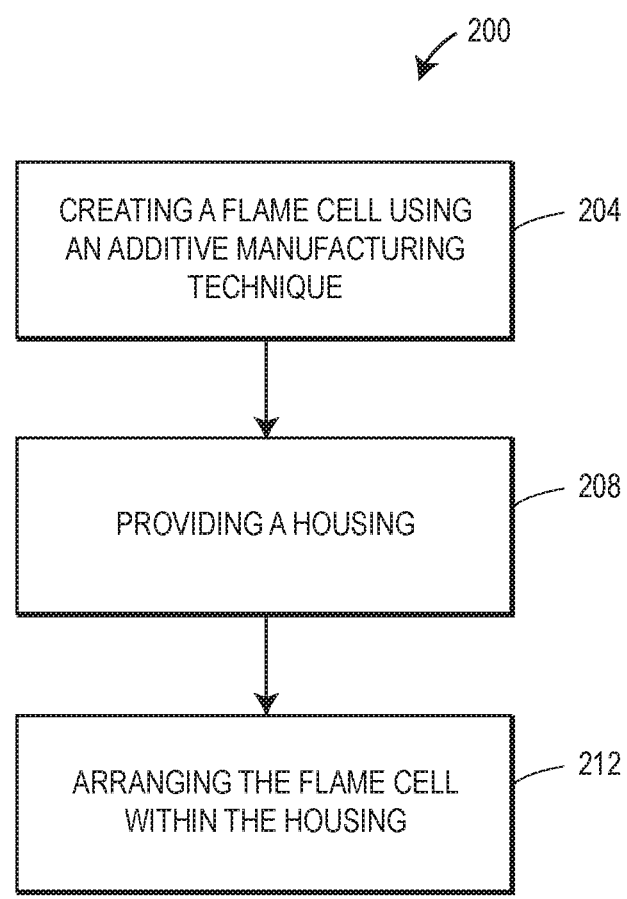
FIG. 2 is a schematic diagram of one example of a process or method according to the teachings of the present disclosure for manufacturing a flame arrestor.

FIG. 2 is a diagram of an example of a method or process 200 according to the teachings of the present disclosure. The method or process 200 schematically depicted in FIG. 2 is a method or process of custom manufacturing a flame arrestor (also referred to herein as a flame arrestor assembly). Like the conventional flame arrestors described above (e.g., the flame arrestor 100), flame arrestors manufactured according to the method or process 200 are configured to remove heat from a flame front, thereby preventing (e.g., extinguishing) a flame from propagating therethrough, but, as described above, does so in a manner that is more efficient and requires less maintenance.

More specifically, the method 200 includes the act 204 of creating a customized flame cell using an additive manufacturing technique. The additive manufacturing technique may be any additive manufacturing technique or process that builds three-dimensional objects by adding successive layers of material on a material. The additive manufacturing technique may be performed by any suitable machine or combination of machines. The additive manufacturing technique may typically involve or use a computer, three-dimensional modeling software (e.g., Computer Aided Design, or CAD, software), machine equipment, and layering material. Once a CAD model is produced, the machine equipment may read in data from the CAD file and layer or add successive layers of liquid, powder, sheet material (for example) in a layer-upon-layer fashion to fabricate a three-dimensional object. The additive manufacturing technique may include any of several techniques or processes, such as, for example, a stereolithography ("SLA") process, a fused deposition modeling ("FDM") process, multi-jet modeling ("MJM") process, a selective laser sintering ("SLS") process, an electronic beam additive manufacturing process, and an arc welding additive manufacturing process. In some embodiments, the additive manufacturing process may include a directed energy laser deposition process. Such a directed energy laser deposition process may be performed by a multi-axis computer-numerically-controlled ("CNC") lathe with directed energy laser deposition capabilities.

The act 204 of creating the customized flame cell thus generally includes forming a body and forming one or more channels in the body. The body can be made of one or more suitable materials, such as, for example, stainless steel, aluminum, various alloys (e.g., high nickel alloys), and by virtue of being customizable, can be any number of different shapes and/or sizes. The one or more channels generally define a flow path that is configured to transfer heat from a flame front propagating through the flow path to the body.

Figure 3A:
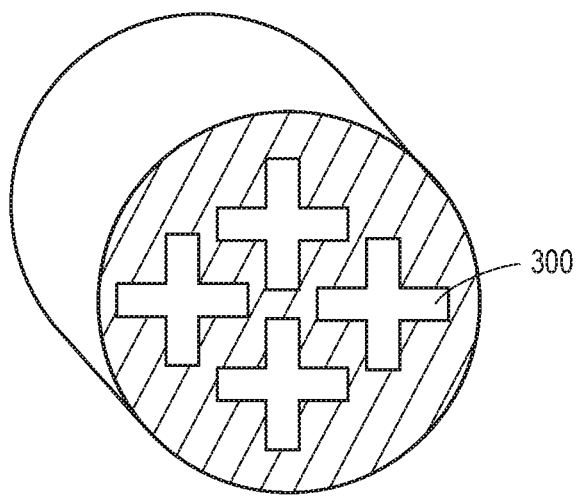
FIG. 3A is an end view of one example of a flame cell manufactured according to the process of FIG. 2 and including channels having a cross-like cross-sectional shape.
Figure 3B:
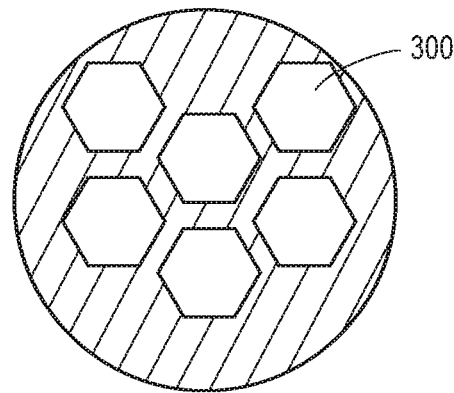
FIG. 3B is an end view of one example of a flame cell manufactured according to the process of FIG. 2 and including channels having a hexagonal cross-sectional shape.
Figure 3C:
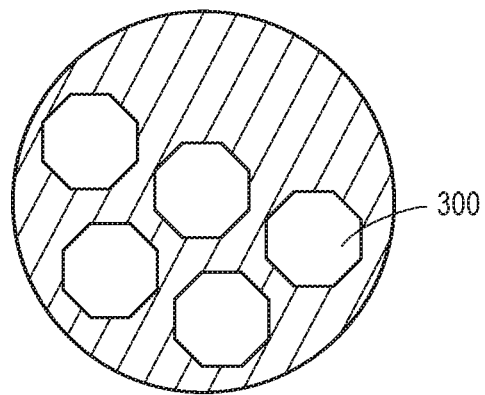
FIG. 3C is an end view of one example of a flame cell manufactured according to the process of FIG. 2 and including channels having an octagonal cross-sectional shape.
Figure 3D:
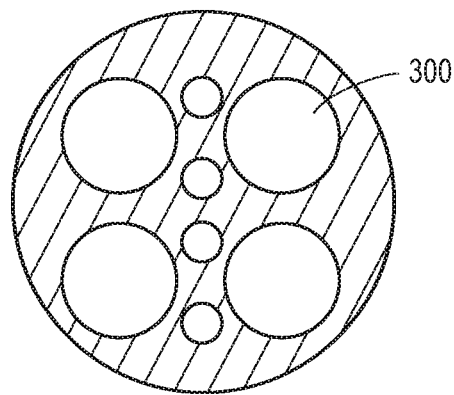
FIG. 3D is an end view of one example of a flame cell manufactured according to the process of FIG. 2 and including channels having a circular cross-sectional shape.
Figure 3E:
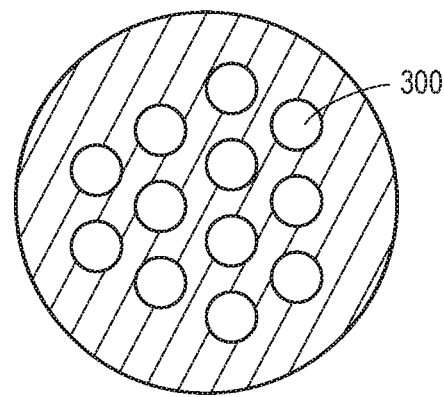
FIG. 3E is an end view of another example of a flame cell manufactured according to the process of FIG. 2 and including channels having a circular cross-sectional shape.
Figure 3F:
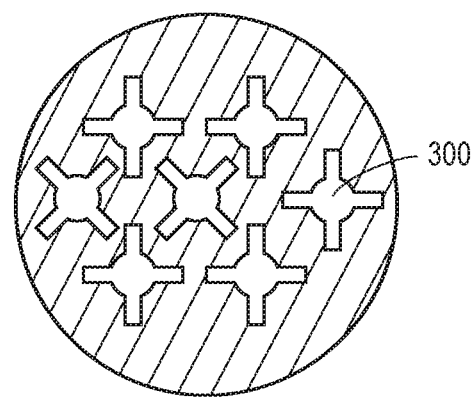
FIG. 3F is an end view of one example of a flame cell manufactured according to the process of FIG. 2 and including channels having an irregularly-shaped cross-section.
Figure 3G:
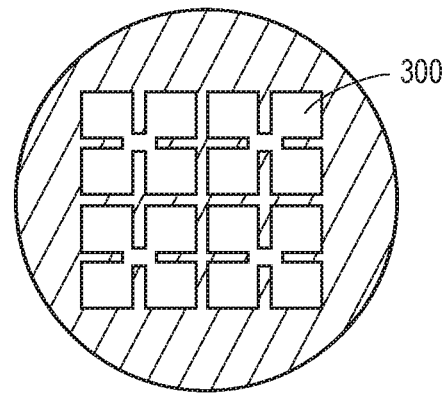
FIG. 3G is an end view of another example of a flame cell manufactured according to the process of FIG. 2 and including channels having an irregularly-shaped cross-section.
Figure 3H:
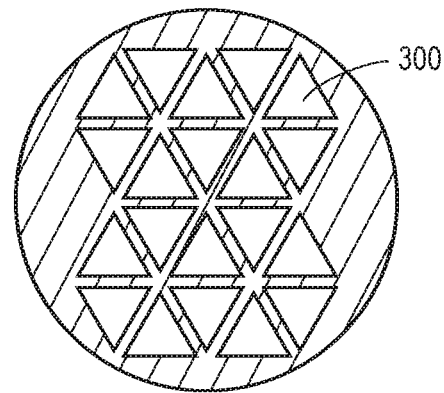
FIG. 3H is an end view of one example of a flame cell manufactured according to the process of FIG. 2 and including channels having a triangular cross-sectional shape and arranged in an alternating pattern.

The one or more channels, which generally extend between opposing ends of the flame cell, can, by virtue of being customizable, have any number of different sizes and/or shapes in cross-section, and/or be arranged in any number of different patterns or arrays. Generally speaking, each of the one or more channels will have a cross-sectional shape that is not limited to being triangular. As examples, FIG. 3A illustrates channels 300 having a cross-like cross sectional shape, FIG. 3B illustrates channels 300 having an hexagonal cross-sectional shape, FIG. 3C illustrates channels 300 having an octagonal cross-sectional shape, FIGS. 3D and 3E each illustrate channels 300 having a circular cross-sectional shape, FIGS. 3F and 3G each illustrate channels 300 having irregularly-shaped cross-sections. Alternatively, each of the channels 300 may have a triangular cross-sectional shape, with those channels 300 arranged in the alternating pattern illustrated in FIG. 3H. Other cross-sectional shapes are possible as well. It will also be appreciated that one or more of the channels may have a different shape and/or size than one or more other channels, as illustrated in, for example, FIG. 3D, wherein all of the channels 300 have a circular shape in cross-section, but some of the channels 300 are larger in diameter than the other channels 300.

As discussed above, the usage of additive manufacturing techniques to custom manufacture the flame cell allows the one or more channels to be formed so as to define a unique and complex, e.g., a non-linear or curved flow path, rather than the standard, linear flow paths utilized in conventional flame arrestors. This is generally accomplished by or via (i) the unique and complex shape of the one or more channels, (ii) rotating the one or more channels about an axis that extends along or is parallel to a centerline of the flame cell, and/or (iii) changing the position of the one or more channels relative to the centerline as the channels extend through the flame cell, such that the one or more channels move away from and/or toward the centerline as the channels extend through the flame cell.

Various portions of the channels may, in turn, be oriented at different angles relative to the axis. As an example, a first portion of one of the channels may be oriented at a first angle relative to the axis, while a second portion of that channel may be oriented at a second angle relative to the axis, the second angle being greater than or less than the first angle. In some cases, one or more portions or components of the channels may be oriented substantially perpendicular or exactly perpendicular relative to the axis of the flame cell. Moreover, while not illustrated herein, different channels may be rotated relative to one another and/or converge toward or diverge away from one another.

Figure 4A:
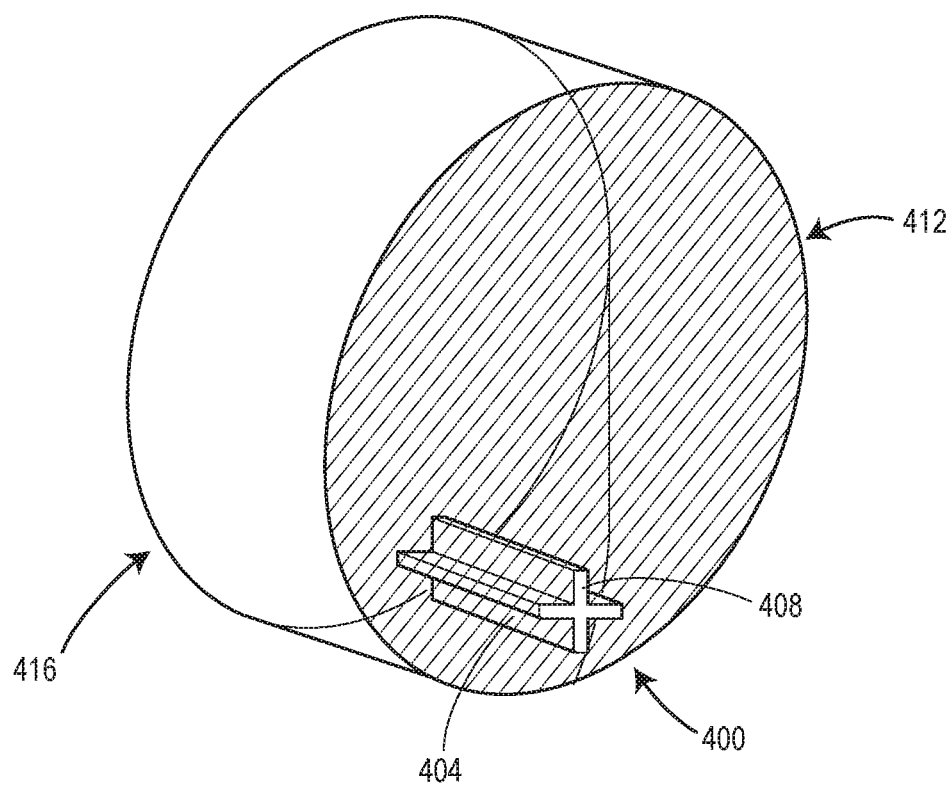
FIG. 4A is a perspective view of a flame cell manufactured according to the process of FIG. 2 and defining a first example of a complex flow path.

FIG. 4A illustrates one example of a flame cell 400 having a unique or complex flow path 404 defined or formed by one or more channels 408 (in this case, one channel 408) that has the cross-like cross-sectional shape illustrated in FIG. 3A. As illustrated, the channel 408 extends between a first end 412 of the flame cell 400 and a second end 416 of the flame cell 400 opposite the first end 408.

Figure 4B:
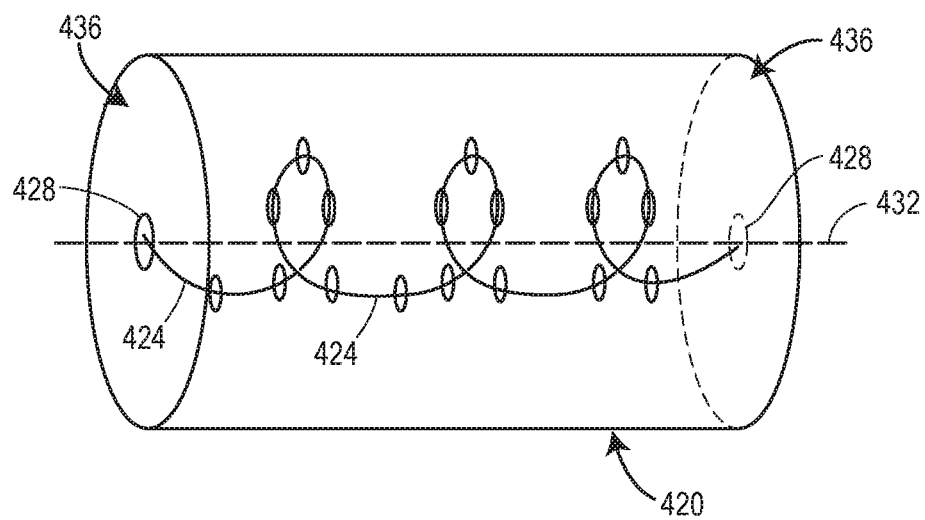
FIG. 4B is a perspective view of a flame cell manufactured according to the process of FIG. 2 and defining a second example of a complex flow path.

FIG. 4B illustrates one example of a flame cell 420 having a non-linear or curved flow path 424 formed by rotating one or more channels 428 (in this case, one channel 428) about a central axis 432 of the flame cell 420. The channel 428 depicted in FIG. 4B has a circular shape in cross-section. As illustrated, the channel 428 is centered on or about the axis 432 at opposing ends 436 of the flame cell 420, but is rotated (e.g., spiraled, wound) about the axis 432 between the ends 436, such that the non-linear flow path 400 takes on a helical form.

Figure 4C:
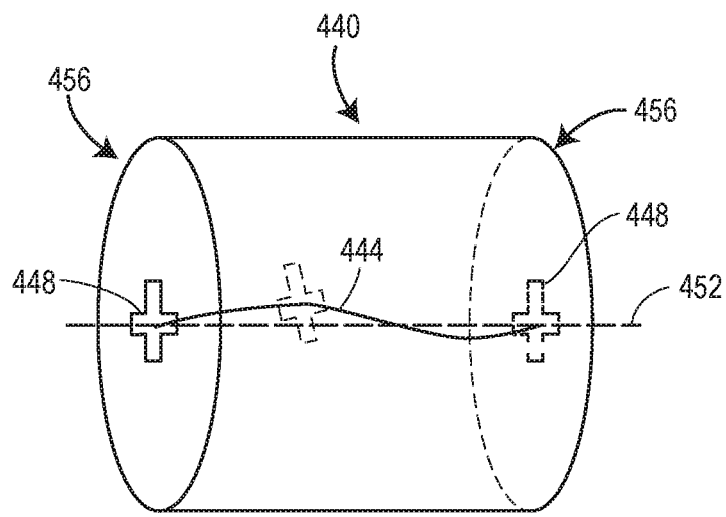
FIG. 4C is a perspective view of a flame cell manufactured according to the process of FIG. 2 and defining a third example of a complex flow path.

FIG. 4C illustrates another example of a flame cell 440 having a non-linear or curved flow path 444 formed by rotating one or more channels 448 (in this case, one channel 448) about a central axis 452 of the flame cell 440. The channel 448 depicted in FIG. 4C has a cross-like shape in cross-section. As illustrated, the channel 448 is centered on or about the axis 452 at opposing ends 456 of the flame cell 440, but is rotated about the axis 452 between the ends 456.

Figure 4D:
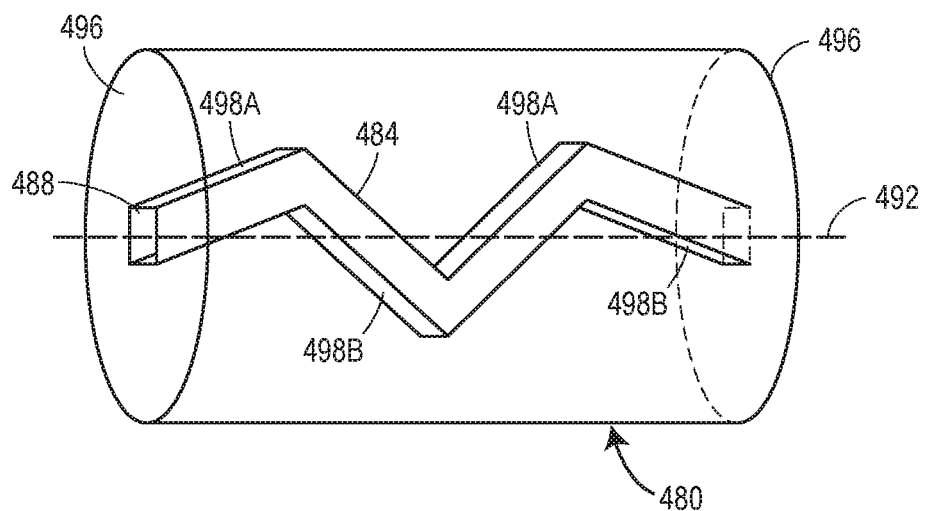
FIG. 4D is a perspective view of a flame cell manufactured according to the process of FIG. 2 and defining a fourth example of a complex flow path.

FIG. 4D illustrates one example of a flame cell 480 having a non-linear or curved flow path 484 formed by changing the position of one or more channels 488 (in this case, one channel 488) about a central axis 492 of the flame cell 480. The channel 488 depicted in FIG. 4D has a substantially rectangular shape in cross-section. As illustrated, the channel 488 is centered on or about the center axis 492 at opposing ends 496 of the flame cell 480, but has two portions 498A that increasingly extend away from the center axis 492 and two portions 498B that increasingly extend toward the center axis 492, such that the flow path 484 zigzags through the flame cell 480.

It will be appreciated that the flame cell can include other unique and complex flow paths depending on the given application. In some cases, the unique and complex flow path can partially include a linear or straight portion, with the remaining portion being curved or non-linear.

In some cases, the act 204 of creating the customized flame cell optionally includes forming a void in the body of the flame cell, and arranging a sensor within the void. The sensor can, for example, be a temperature, photo, infrared, pressure, or other type of sensor. The sensor can, in turn, be communicatively connected (either via a wired connection or a wireless connection) to a controller, thereby allowing the controller and/or a user to remotely monitor the flame cell without having to shut down the system employing the flame cell. This allows the controller and/or the user to, for example, remotely monitor or detect the temperature or pressure within the flame cell (e.g., the temperature of the body, the temperature of the flame front), as well as other parameters and data, as desired.

The method or process 200 also includes the act 208 of providing a housing for the flame cell. The housing generally includes an inlet arranged to be coupled to an upstream component of the pipeline in which the flame arrestor is employed, as well as an outlet arranged to be coupled to a downstream component of the pipeline. The housing also includes a chamber or cavity sized to receive the flame cell, as well as additional components for securely retaining the flame cell within the housing.

In some cases, the act 208 of providing the housing for the flame cell may involve manufacturing the housing using conventional manufacturing techniques, either before, after, or at the same time as the act 204 is performed. In other cases, however, the act 208 of providing the housing for the flame cell may involve creating the housing using one of the additive manufacturing techniques described above. The housing may be created using a different additive manufacturing technique as the flame cell or using the same additive manufacturing technique as the flame cell. In either situation, the housing may be created before, after, or at the same time as the flame cell is created.

The method or process 200 further includes the act 212 of securely arranging the created flame cell within the provided housing, thereby forming the flame arrestor. In some cases, e.g., when the housing is manufactured using conventional techniques, the created flame cell may be secured within the housing using threaded bolts or any other known suitable means. In other cases, e.g., when the housing is manufactured using the same additive manufacturing technique used to manufacture the flame cell, the flame cell can be secured within the housing by printing the flame cell onto the housing (using additive manufacturing), thereby forming a unitary, one-piece flame arrestor.

It will be appreciated that the acts 204, 208, and/or 212 can be performed any number of different times. In some cases, the act 204 can be performed multiple times so as to create multiple (e.g., two, three, four, and so on) flame cells for use in a single housing. Beneficially, because the flame cells will promote greater levels of turbulent flow than conventional flame arrestors, the flame cells can be arranged within the housing, adjacent one another, without having to dispose screens or expanded metal therebetween, as is the case in some conventional flame arrestors. In other cases, the act 204 can be performed multiple (e.g., two, three, four, and so on) times, with the acts 208 and 212 also performed multiple times, so as to create multiple flame arrestors each having a single flame cell.

Figure 5:
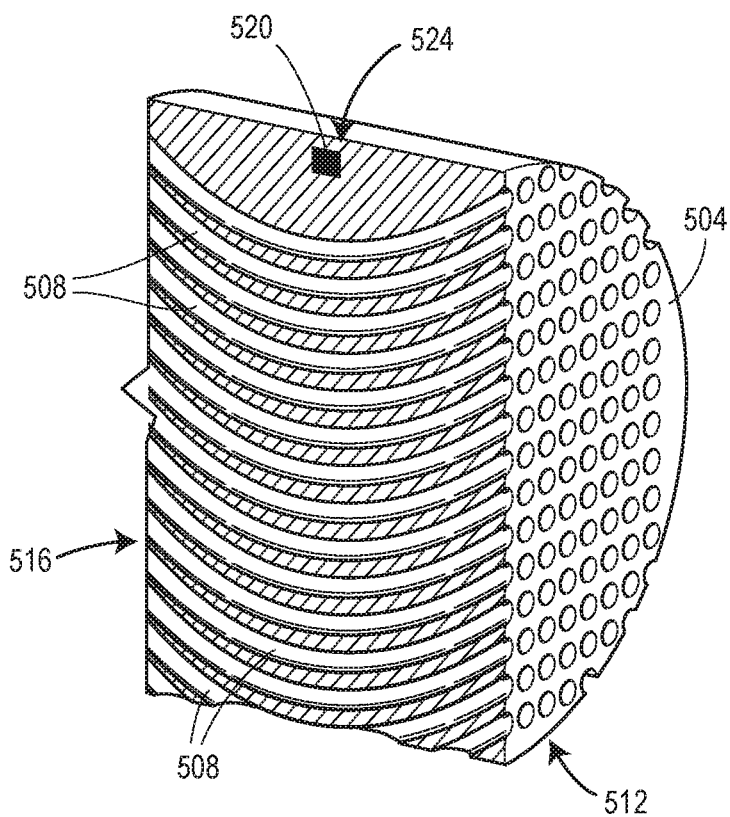
FIG. 5 is a cross-sectional view of a flame cell manufactured according to the process of FIG. 2 and including a plurality of curved channels.

FIG. 5 illustrates another example of a flame cell 500 custom manufactured using the method or process 200. The flame cell 500 has a substantially cylindrical body 504 and a plurality of channels 508 formed or defined in the body 504. Each of the channels 508 has a circular shape in cross-sectional and extends between a first end 512 of the flame cell 500 and a second end 516 of the flame cell 500 opposite the first end 512. As illustrated, each of the channels 508 is curved between the first and second ends 512, 516, such that the channels 508 define a curved, or non-linear, flow path. As discussed above, this curved, or non-linear, flow path advantageously promotes or induces turbulent flow so as to ensure adequate heat transfer from the flame front to the flame cell 500 as fluid flows through the flame cell 500. The flame cell 500 also includes a void 520 that is formed or defined in the body 504 during manufacturing and is sized to receive a sensor 524 (e.g., a temperature, photo, infrared, pressure, or other type of sensor). While not depicted herein, the sensor 524 can be communicatively connected (either via a wired connection or a wireless connection) to a controller, thereby allowing the controller and/or a user to remotely monitor the flame cell 500 without having to shut down the system employing the flame cell 500.

In addition to the benefits described above associated with manufacturing flame cells and flame arrestors using additive manufacturing techniques, the methods described herein also allow for manufacture of a hybrid composite flame cell and a hybrid composite flame arrestor, which may have improved efficiency and may be more cost-effective than existing flame cells and flame arrestors. For example, a hybrid composite flame cell may have a body, as described above, of a first material and an element of a second material having better (i.e., increased) thermal conductivity properties than the materials used to form the body of the flame cell. As explained below, the element of the second material may transfer heat from fluid flow away from the interior core of the body of the flame cell to a location outside of the flame cell. Additionally or alternatively, the second material of the element may increase the flame cell life span by having improved corrosion resistance and chemical resistance over the first material.

Figure 1A:
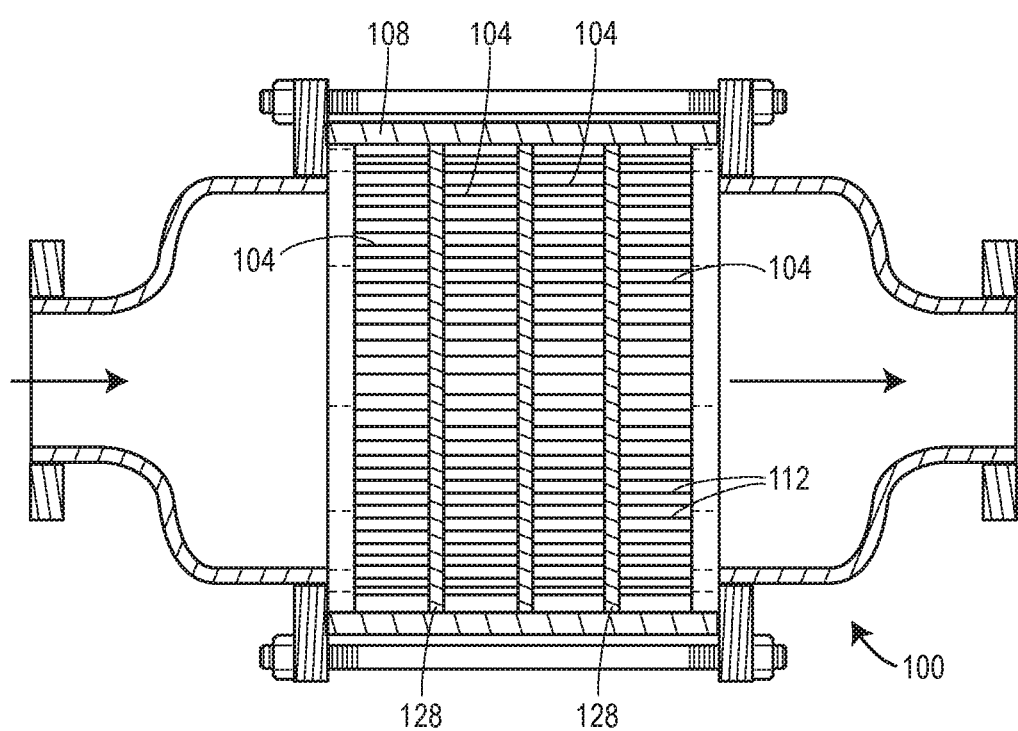
FIG. 1A is a cross-sectional view of a conventional flame arrestor assembly.
Figure 1B:
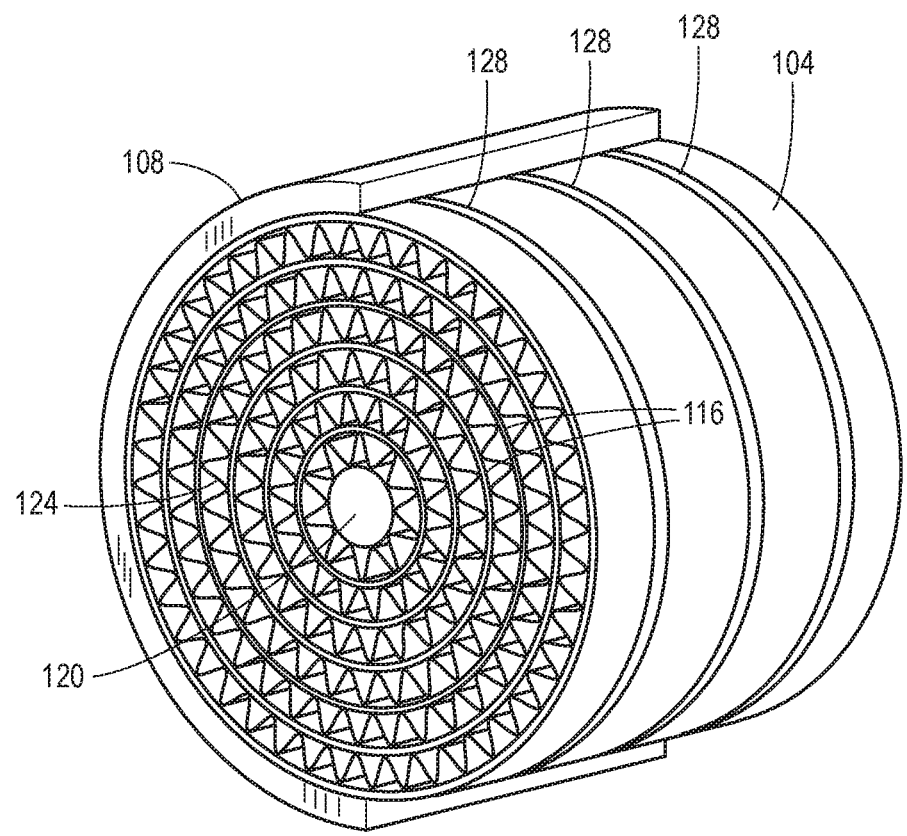
FIG. 1B is a perspective view of a portion of the conventional flame arrestor assembly of FIG. 1A.
Figure 6:
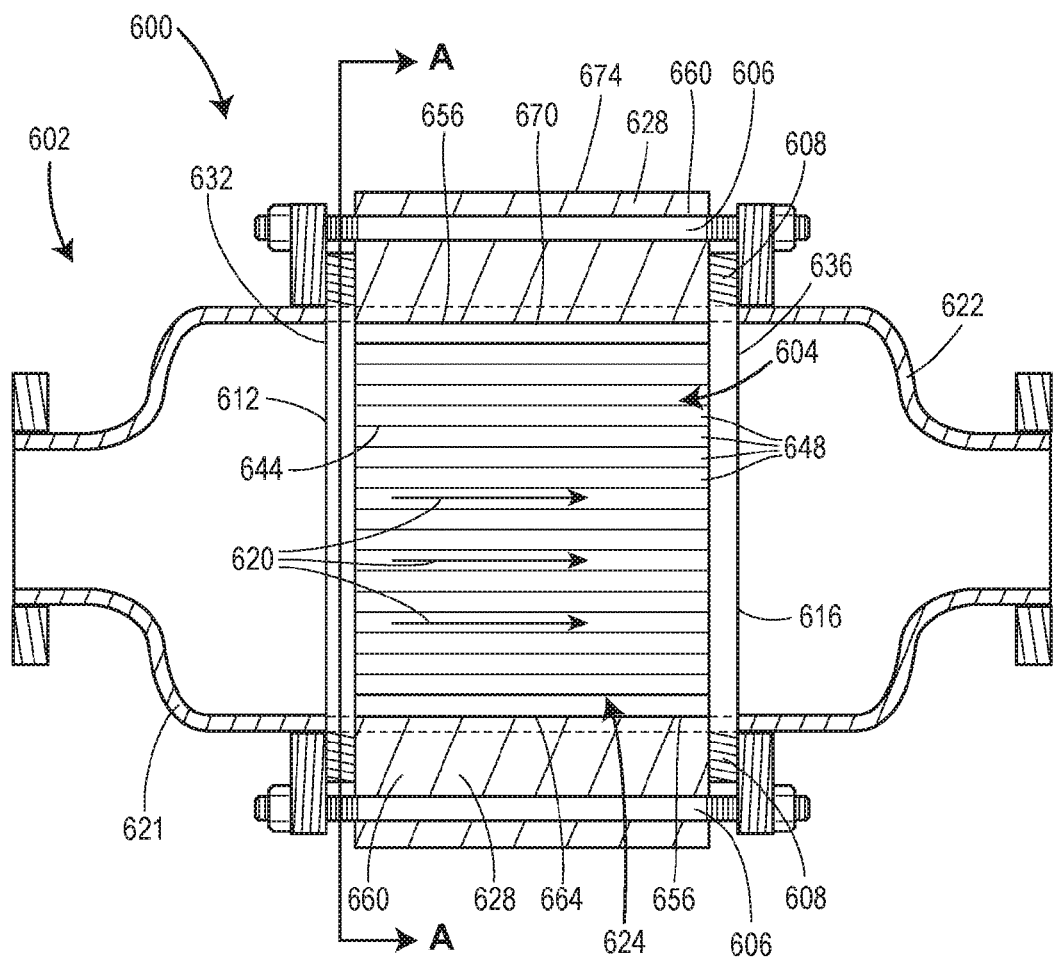
FIG. 6 is a cross-sectional view of a first example of a flame arrestor constructed according to the teachings of the present disclosure.

FIG. 6 is an example of a hybrid composite flame arrestor 600 of an element assembly 602, similarly situated in a pipeline as the arrestor 100 is in FIG. 1A. The element assembly 602 includes the flame arrestor 600, which includes a hybrid composite flame cell 604 disposed within a housing 608. The housing 608 is adapted to be disposed within a fluid passageway, such as a pipeline, and is attached to the passageway by crossbars 606. The housing 608 includes an inlet 612 and an outlet 616 connected by a fluid flow path 620. The flame cell 604 is disposed within the fluid flow path 620 of the housing 608, which may be accomplished by installing (e.g., welding) the flame cell 604 in the housing 608 or by integrally forming the flame cell 604 with the housing 608 by any of the additive manufacturing techniques discussed above and as will be described in more detail below. The housing 608 is disposed between a first element end 621 and a second element end 622 of the element assembly 602.

Figure 7:
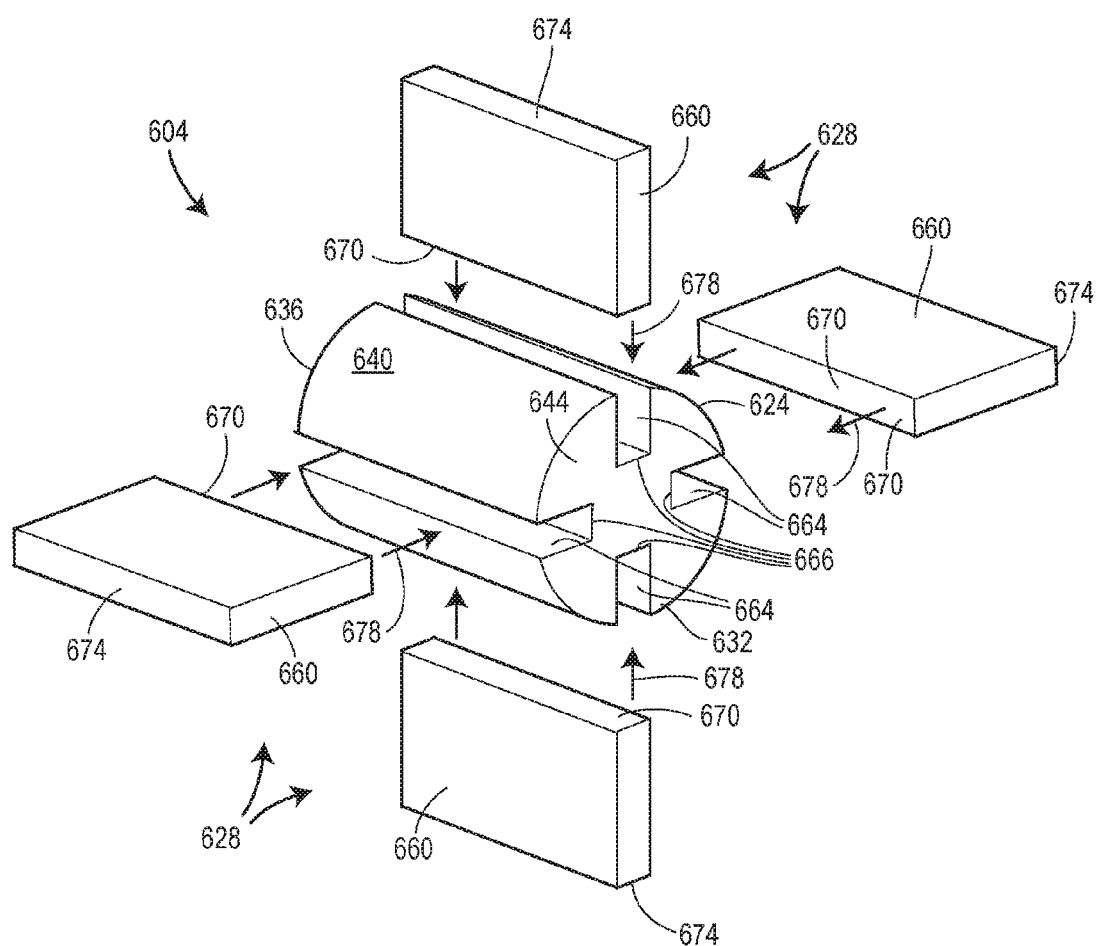
FIG. 7 is an exploded view of a flame cell of the flame arrestor of FIG. 6.
Figure 8:
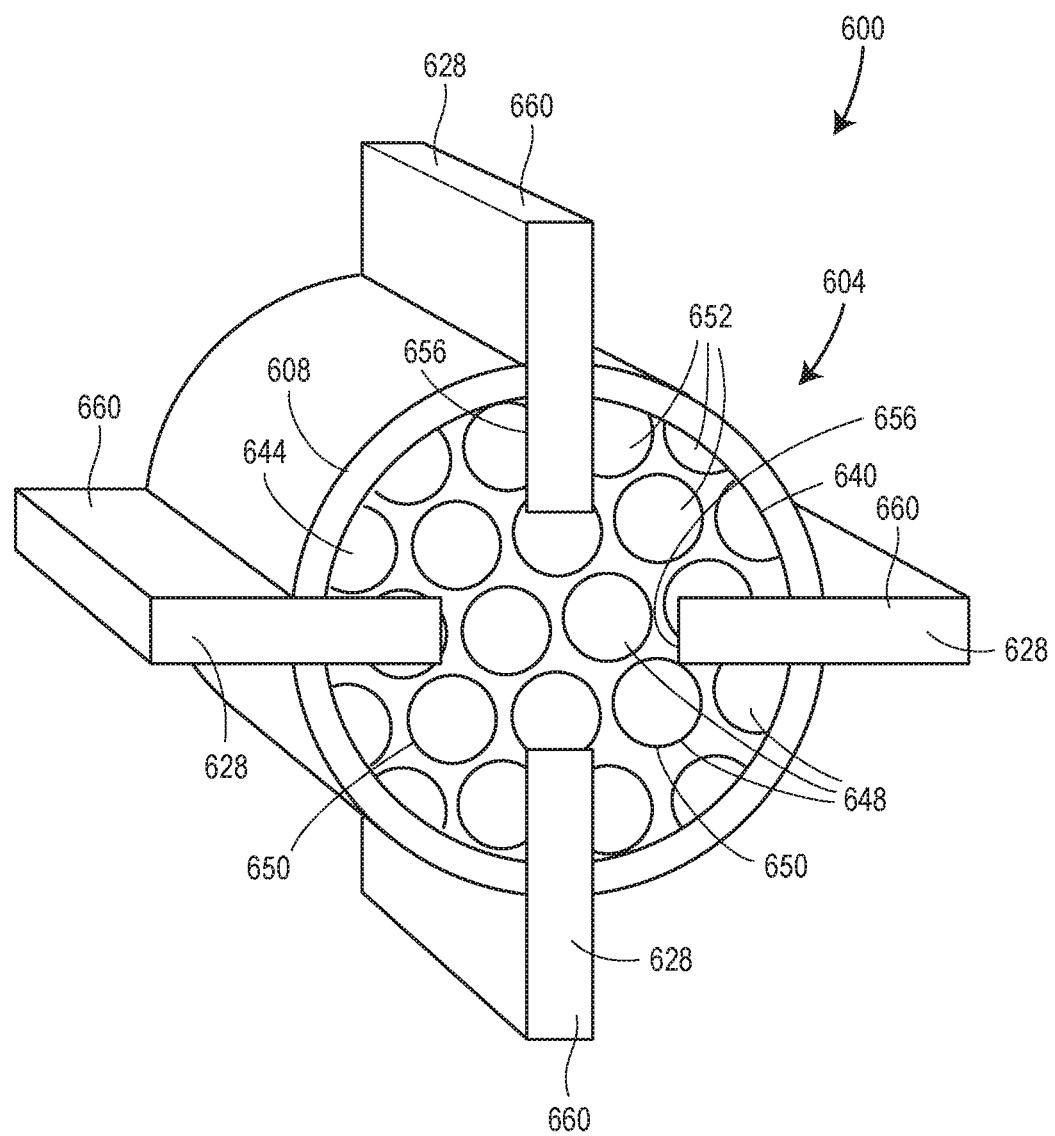
FIG. 8 is a perspective view of the flame arrestor of FIG. 6 including the flame cell of FIG. 7.

In the example illustrated in FIGS. 6-8, the flame cell 604 includes a body 624 of a first material and an element 628 of a second material. The body 624 of the flame cell 604 includes opposing first and second ends 632, 636, an exterior surface 640, and an interior core 644. The interior core 644, which is surrounded by the exterior surface 640, has a plurality of channels 648 extending from the first end 632 to the second end 636 of the body 624. As best illustrated in FIG. 6, the plurality of channels 648 are linear, and as best shown in FIG. 8 the plurality of channels have a circular-shaped cross-section 650 or a partially circular-shaped cross-section 652. The exterior surface 640 may be a smooth outer layer that provides a walled enclosure to the plurality of channels 648, as illustrated in FIG. 7. In another example, the exterior surface 640 may be uneven and without a walled enclosure, and therefore may expose some of the channels 648. In other examples of flame cells 604, the plurality of channels 648 may have any number of different sizes and/or shapes in cross-section, and/or be arranged in any number of different patterns or arrays, as shown in FIGS. 3A-3H, for example. The plurality of channels 648 may define any of the unique and complex (e.g., non-linear) flow paths illustrated in FIGS. 4A and 5.

The element 628 is coupled to the body 624 at an interface 656 so that the second material of the element 628 is disposed adjacent to the first material of the body 624, as shown in FIGS. 6 and 7. The second material of the element 628 is different than the first material of the body 624, and is configured to draw heat away from fluid flowing through the plurality of channels 648. So configured in the hybrid composite flame cell 604, the first material of the body 624 is in contact with a flame front while the second material of the element 628 is directly adjacent to the first material. The second material, which may have a higher thermal conductivity property than the first material, may enhance heat transfer from the interior core 644 of the body 624 to the atmosphere or to other safe locations. The second material may additionally or alternatively have different properties related to thermal conductivity, corrosion resistance, chemical resistance, etc. to improve burn ratings, decrease weight, and decrease pressure drop of the flame arrestor. As an example, the second material may be more corrosion resistant than the first material. The first material can be, for example, stainless steel, aluminum, various alloys (e.g., high nickel alloys), and/or one or more other suitable materials. The second material is different than the first material and can be, for example, copper, copper alloy, aluminum, austenitic stainless steel, high nickel alloys, and other exotic alloys (e.g. Beryllium, Iridium, Tungsten elements alloyed with other materials with high thermal conductivity values).

The element 628 in the example of FIGS. 6-8 includes or takes the form of a plurality of rectangular inserts 660 that extend from the first end 632 to the second end 636 of the flame cell 604. Each of the plurality of inserts 660 may be inserted into a respective one of a plurality of slots 664 formed in the body 624. As best shown in FIG. 7, each of the slots 664 includes an end 666 located within the interior core 644 of the body 624 and extends through the interior core 644, terminating at the exterior surface 640 of the body 624. Each of the inserts 660 includes a first end 670 disposed within the end 666 of the slot 664 and a second end 674 located outside the exterior surface 640 of the body 624. When positioned in the slots 664 as shown in FIG. 8, the inserts 660 may enhance the process of drawing heat away from the interior core 644 of the flame cell 604 to a location outside of the flame cell 604 (e.g. the atmosphere). In another example of a flame cell 604, the body 624 may include a single slot 664 sized to receive a single element 628. The body 624 may alternatively include a plurality of slots 664 of varying shapes that are sized to receive an element or elements 628 of varying shapes. For example, and as described above, the body 624 may have a unique shape according to the environment in which the flame arrestor 600 is installed. Each insert 660 of the element 628 may have a different cross-section than the rectangular cross-section of the inserts 660 illustrated in FIGS. 6-8, such as, for example, a triangular, circular, or irregularly-shaped cross-section.

In FIG. 7, the element 628 is coupled to the body 624 of the flame cell 604 by inserting each insert 660 in the direction shown by the arrows 678 into a respective one of the plurality of slots 664 formed in the body 624. In this example, the inserts 660 and the body 624 are manufactured separately by conventional means, by any additive manufacturing technique, and/or both, and then the components are coupled (e.g., assembled) to form the flame cell 604. In other examples described below, the element 628 may be coupled to (e.g., integrally formed with) the body 624 by any additive manufacturing technique. The element 628 may be coupled to the exterior surface 640 of the body 624 or may be entirely disposed within the exterior surface 640 of the body 624, as described below. In other examples, the element 628 may be coupled to the body 624 by attaching the element 628 directly to the exterior surface 640 of the body 624.

FIG. 8 illustrates the housing 608 when coupled to the body 624 of the flame cell 604. As illustrated, the inserts 660 traverse the housing 608 and the exterior surface 640 of the body 624, and at least part of each of the inserts 660 is disposed within the interior core 644 at the interface 656. As illustrated in FIGS. 7 and 8, the inserts 660 generally extend in a direction parallel to a longitudinal axis of the flame cell 604 between opposing first and second ends 632, 636 of the flame cell 604. The housing 608 may be coupled to the body 624 by conventional methods (e.g., welding) or the housing 608 may be coupled by being integrally formed with the body 624 of the flame cell 604 by any additive manufacturing technique.

The flame arrestor 600 illustrated in FIG. 8 may be created using different methods or processes, including any additive manufacturing technique and/or assembling the element 628, body 624, and housing 608 after each is separately manufactured. One or more of the components of the flame arrestor 600 may be integrally formed using any additive manufacturing technique. For example and as described above in relation to FIGS. 1-5, the body 624 of the flame cell 604 may be formed using an additive manufacturing technique by depositing a plurality of layers of the first material in pattern to form a lattice structure made of connected lattice members. The element 628 may be disposed in a similar manner on one or more of the layers of the first material such that the first material is adjacent to the second material of the element 628 at an interface.

Figure 9:
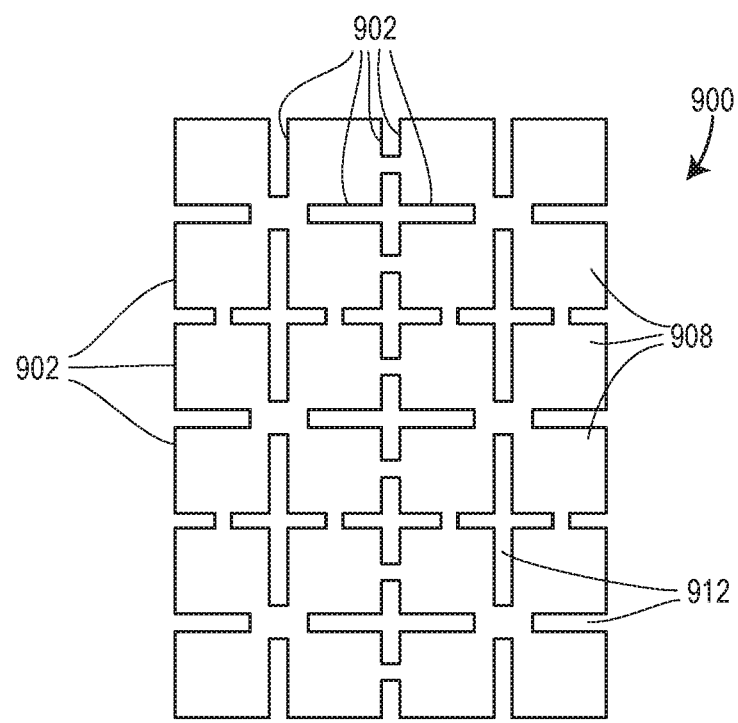
FIG. 9 is an exemplary arrangement of a lattice structure of a flame cell body manufactured according to the teachings of the present disclosure.

FIG. 9 illustrates an example of a front view of an array 900 of a flame cell body that may be formed using an additive manufacturing technique. The array 900 includes a plurality of connected lattice members 902 of the first material. Each array 900 may be deposited in a patterned arrangement, which in this case is a square clover configuration. The connected lattice members 902 define a plurality of openings 908, and also separate the openings 908 from a cavity 912. By extruding the array 900, for example, by depositing a plurality of layers using an additive manufacturing technique, a three-dimensional lattice structure is formed where the openings 908 defined by the lattice members 902 define a plurality of channels of the flame cell body, as illustrated in FIG. 10.

Figure 10:
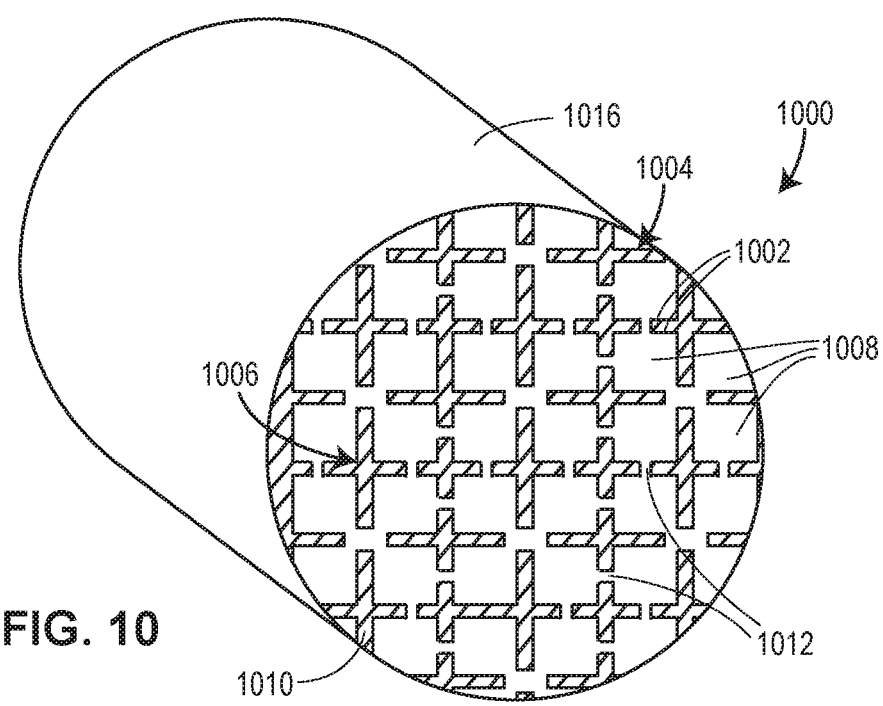
FIG. 10 is a second example of a flame arrestor and a flame cell having the lattice structure arrangement of FIG. 9 manufactured according to the teachings of the present disclosure.

FIG. 10 illustrates a flame arrestor 1000 having a flame cell 1004 with a body 1006, also referred herein as a three-dimensional lattice structure, and an element 1010 coupled to the body 1006. The body 1006 includes a plurality of connected lattice members 1002, similar to the lattice members 902 discussed above, that define a plurality of channels 1008. The element 1010 of a second material, which in this example takes the form of a core but may alternatively include multiple components and/or a different structure, is disposed within a plurality of cavities 1012 formed in the three-dimensional lattice structure 1006 by the connected lattice members 1002. The lattice members 1002 of the body 1006 serve as an interface between the plurality of channels 1008 and the element 1010. The element 1010 may be integrally formed with the body 1006 using any additive manufacturing technique to form the flame cell 1004, for example, by depositing the second material adjacent the first material. In another example, the element 1010 may be injected, attached to, or otherwise disposed in the cavities 1012 formed by the lattice members 1002.

As also illustrated in FIG. 10, the flame cell 1004 is disposed within a housing 1016. The housing 1016 may be a layer of the first material (i.e., the same material as the body 1006) deposited onto the flame cell 1004 or may be the same material as the element 1010. Alternatively, the housing 1016 may be a third material that is different than the first material of the body 1006 and the second material of the element 1010. The housing 1016 may be integrally formed with the three-dimensional lattice structure 1006 and/or the element 1010 of the flame cell 1004 using any additive manufacturing technique. In one method, the plurality of layers that define the three-dimensional lattice structure 1006 may be directly deposited or disposed on an interior portion of the housing 1016. In another method, the housing 1016 may be formed separately from the flame cell 1004 and attached to the flame cell by conventional methods. As used herein, the term "layer" may include a single deposit of a material or multiple deposits of a material in a single plane.

Figure 11:
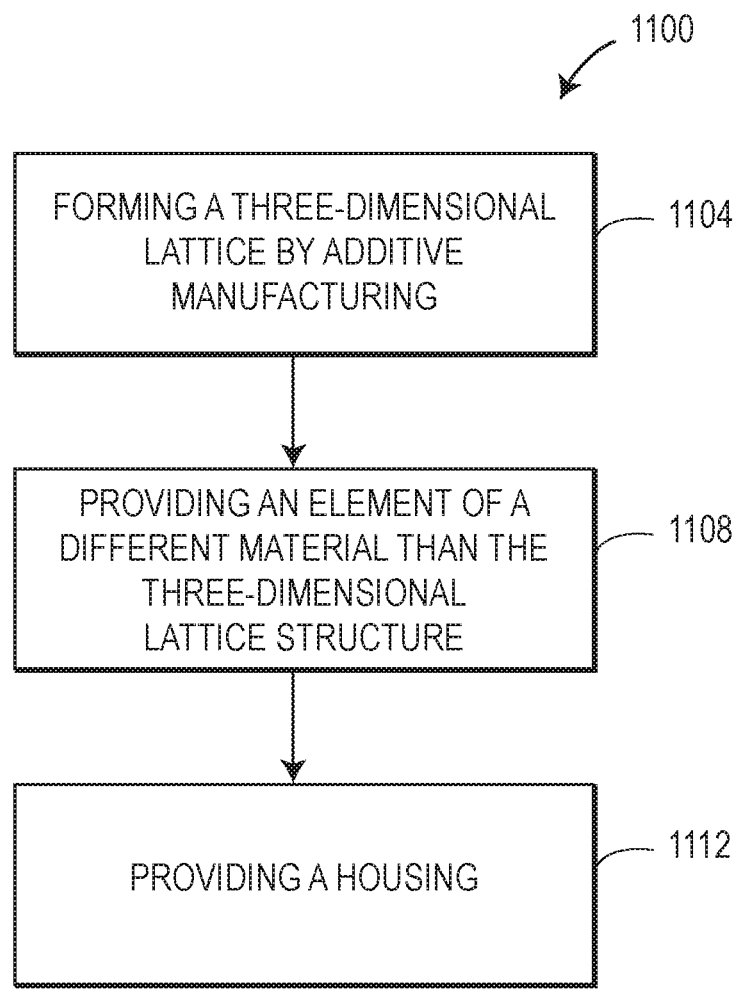
FIG. 11 is a schematic diagram of one example of a process or method according to the teachings of the present disclosure for manufacturing a hybrid composite flame arrestor.

FIG. 11 is a diagram of an example of a method or process 1100 according to the teachings of the present disclosure. The method or process 1100 schematically depicted in FIG. 11 is a method or process of custom manufacturing a flame arrestor, such as the flame arrestor 600 illustrated in FIGS. 6 and 8, and the flame arrestor 1000 illustrated in FIG. 10. The method 1100 includes a step 1104 of forming a three-dimensional lattice structure using an additive manufacturing technique, such as any of the additive manufacturing techniques or processes described above. The three-dimensional lattice structure includes a plurality of connected lattice members defining a plurality of channels, such as the channels 648, 1008 in FIGS. 6 and 7 and FIG. 10, respectively, extending from a first end of the three-dimensional lattice structure to a second end of the three-dimensional lattice structure. The method or process 1100 also includes a step 1108 of providing an element (e.g., an insert, a core) of a different material than the three-dimensional lattice structure, where the material of the element is configured to draw heat away from fluid flowing through the plurality of channels of the lattice structure.

The method or process 1100 may include the step 1112 of providing a housing having an interior surface and an exterior surface. In some cases, the step 1112 of providing the housing for the flame cell may involve manufacturing the housing using conventional manufacturing techniques, either before, after, or at the same time as the step 1104 or step 1108 is performed. In other cases, however, the step 1112 of providing the housing for the flame cell may involve creating the housing using any one of the additive manufacturing techniques described above. The housing may be created using a different additive manufacturing technique as the flame cell or using the same additive manufacturing technique as the flame cell. In either situation, the housing may be created before, after, or at the same time as the flame cell is created.

The step 1104 of forming the three-dimensional lattice structure may include forming a cavity to receive the element or forming one or more slots to receive the element. The step 1104 of forming a cavity, a slot, or a plurality of slots may include milling the three-dimensional lattice structure after the three-dimensional lattice structure is made. The step 1104 of forming the three-dimensional lattice structure may alternatively include integrally forming the housing and the three-dimensional lattice structure using any additive manufacturing technique, and/or integrally forming the three-dimensional lattice structure with the element using any additive manufacturing technique.

The step 1108 of providing the element may including coupling the element to the body of the flame cell. The step 1108 of providing the element may include, for example, depositing a layer of a second material onto the three-dimensional lattice structure, or body, using any additive manufacturing technique. Alternatively, the step 1108 of providing the element may include forming a plurality of inserts separately from the body and then attaching the inserts to the body by placing the inserts into the slots formed in the body, for example as illustrated in FIG. 7. The step 1108 of providing the element may also include partially placing the plurality of inserts into slots formed in the body, where the inserts are partially located outside of the body, as illustrated in FIG. 8. The step 1108 of providing the element may also include injecting or depositing using any additive manufacturing technique techniques the second material between each of the plurality of channels formed in the body, for example as illustrated in FIG. 10. The step 1108 of providing the element may further include attaching the element to an exterior surface of the body such that the element is disposed outside of the lattice structure, but adjacent to the first material of the body.

Figure 12:
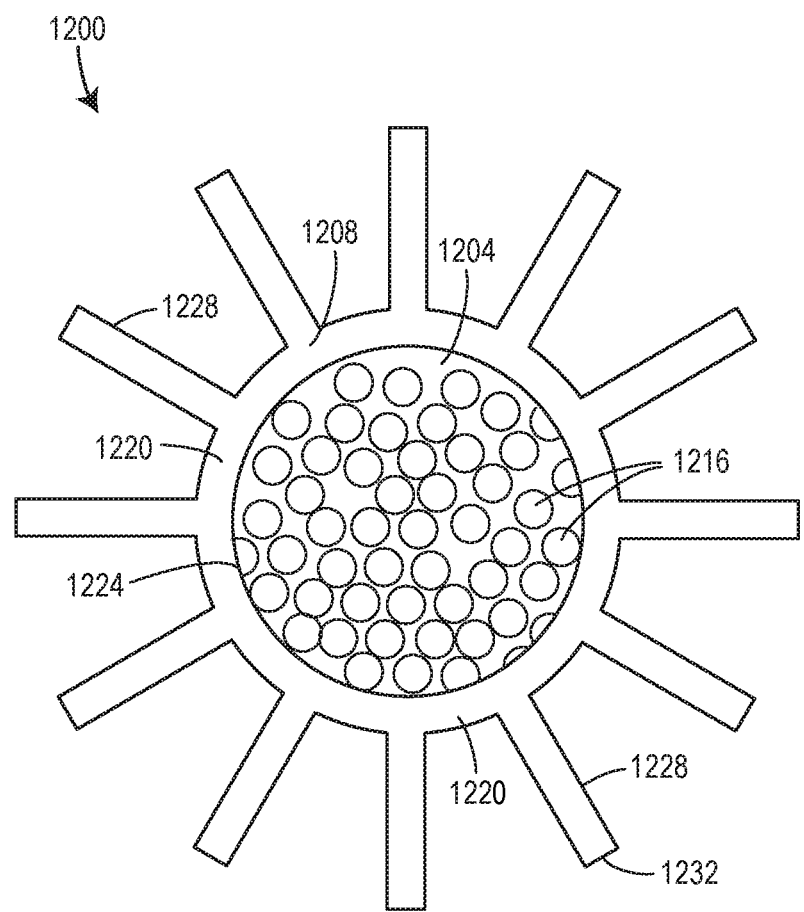
FIG. 12 is a front view of a third example of a flame cell constructed according to the teachings of the present disclosure.

Turning now to FIG. 12, another example of a flame cell 1200 includes a body 1204 of a first material and an element 1208 of a second material disposed adjacent to the body 1204. The flame cell 1200 includes an interior core 1212 including a plurality of channels 1216, where each of the channels 1216 has a circular cross-section. The element 1208, which may functionally serve as a housing of a flame arrestor, includes a cylindrical sheath portion 1220 that is coupled to (e.g., surrounds) the body 1204 at or along an exterior surface 1224 of the body 1204, and a fin portion 1228 that includes a plurality of fins extending outward from the sheath portion 1220 of the element 1208. Each fin 1228 includes an end 1232 spaced away from the exterior surface 1224 of the body 1204, and, consistent with the foregoing, each fin 1228 is configured to draw heat away from the body 1204 to a location away from the plurality of channels 1216. As described above, the flame cell 1200 may be manufactured by any additive manufacturing technique, conventional methods, or a combination of conventional and additive manufacturing methods.

Preferred embodiments of this invention are described herein, including the best mode or modes known to the inventors for carrying out the invention. Although numerous examples are shown and described herein, those of skill in the art will readily understand that details of the various embodiments need not be mutually exclusive. Instead, those of skill in the art upon reading the teachings herein should be able to combine one or more features of one embodiment with one or more features of the remaining embodiments. Further, it also should be understood that the illustrated embodiments are exemplary only, and should not be taken as limiting the scope of the invention. All methods described herein can be performed in any suitable order unless otherwise indicated herein or otherwise clearly contradicted by context. The use of any and all examples, or exemplary language (e.g., "such as") provided herein, is intended merely to better illuminate the aspects of the exemplary embodiment or embodiments of the invention, and do not pose a limitation on the scope of the invention. No language in the specification should be construed as indicating any non-claimed element as essential to the practice of the invention.

What is claimed is:

1. A flame arrestor comprising:
  a housing adapted to be disposed within a fluid passageway, the housing having an inlet, an outlet, and a fluid flow path connecting the inlet and the outlet;
  a flame cell disposed within the fluid flow path of the housing, the flame cell comprising:
    a body of a first material having a first end, a second end, an exterior surface, and an interior core, the interior core having a plurality of channels extending from the first end to the second end of the body, and
    an element of a second material disposed adjacent to the body, the second material being different from the first material, wherein the element is configured to draw heat away from fluid flowing through the plurality of channels; and
  wherein a first portion of the element is disposed outside the exterior surface of the body and a second portion of the element is disposed within the interior core of the body.

2. The flame arrestor of claim 1, further comprising a slot formed within the interior core of the body, wherein the element is an insert disposed within the slot of the interior core.

3. The flame arrestor of claim 1, wherein the body further includes a plurality of layers of the first material defining a lattice structure, and wherein the element is disposed on one of the plurality of layers such that the one of the plurality of layers is disposed adjacent to the second material.

4. The flame arrestor of claim 1, wherein the element is integrally formed with the body.

5. The flame arrestor of claim 4, wherein the body further includes a plurality of layers of the first material defining a lattice structure, the lattice structure of the body being integrally formed with the element by an additive manufacturing technique.

6. The flame arrestor of claim 1, wherein the body and the housing are integrally formed of the first material.

7. The flame arrestor of claim 1, further comprising a plurality of slots formed in the body, each of the plurality of slots including an end located within the interior core of the body; and
  wherein the element includes a plurality of inserts, each insert having a first end disposed within the end of the slot and a second end located outside the exterior surface of the body.

8. A flame cell of a flame arrestor, the flame cell comprising:
  a body of a first material having a first end, a second end, an exterior surface, and a plurality of channels formed in the body and extending from the first end to the second end of the body, the exterior surface providing a walled enclosure to the plurality of channels; and
  an element of a second material coupled to the body, the second material being different from the first material, wherein the element is configured to draw heat away from fluid flowing through the plurality of channels; and
  wherein the element extends outwardly from the exterior surface of the body.

9. The flame cell of claim 8, wherein the element is coupled to the body by depositing a layer of the second material onto a layer of the first material.

10. The flame arrestor of claim 8, further comprising a slot formed in the body and sized to receive the element, and wherein the element is coupled to the body by inserting the element into the slot.

11. The flame arrestor of claim 8, further comprising a plurality of slots formed in the body,
  wherein the element includes a plurality of inserts disposed within the plurality of slots, each of the inserts having a first end disposed within the body and a free end located outside the body.

12. A method of custom manufacturing a flame arrestor, the method including:
  providing a housing having an interior surface and an exterior surface, the exterior surface of the housing being shaped to fit within a fluid passageway;
  forming, using an additive manufacturing technique, a three-dimensional lattice structure by depositing a first material onto the interior surface of the housing in a predetermined pattern, wherein the lattice structure includes a plurality of connected lattice members forming channels extending from a first end to a second end of the three-dimensional lattice structure;

providing an element of a second material adjacent to the three-dimensional lattice structure, wherein the second material is different than the first material, the element configured to draw heat away from fluid flowing through the plurality of channels, wherein a first portion of the element is disposed outside the exterior surface of the body and a second portion of the element is disposed within the interior core of the body.

13. The method of claim 12, wherein forming the three-dimensional lattice structure further includes forming a cavity within the three-dimensional lattice structure, and wherein providing the element of the second material comprises inserting the element into the cavity.

14. The method of claim 12, wherein forming the three-dimensional lattice structure comprises forming a slot in the three-dimensional lattice structure, and wherein providing the element comprises inserting the element within the slot, the element extending through the exterior surface of the housing.

15. The method of claim 12, wherein forming the three-dimensional lattice structure comprises forming a plurality of slots in the three-dimensional lattice structure;

and wherein providing the element includes forming a plurality of inserts and placing each of the plurality of inserts into a respective one of the plurality of slots, each of the inserts extending through the exterior surface of the housing.

16. The method of claim 12, wherein providing the housing includes forming the housing by the additive manufacturing technique using a third material that is different than the first material.

17. The method of claim 12, wherein providing the housing includes integrally forming the housing and the three-dimensional lattice structure of the first material by the additive manufacturing technique.

18. A method of manufacturing a flame cell of a flame arrestor, the method including:

forming, using an additive manufacturing technique, a three-dimensional lattice structure of a first material, the three-dimensional lattice structure including a plurality of connected lattice members defining a plurality of channels extending from a first end of the three-dimensional lattice structure to a second end of the three-dimensional lattice structure, including an exterior surface providing a walled enclosure to the plurality of channels, providing an element;

extending from the first end of the three-dimensional lattice structure to the second end of the three-dimensional lattice structure, the element being a second material different than the first material; and coupling the element to the three-dimensional lattice structure, the element configured to draw heat away from fluid flowing through the plurality of channels, with the element extending outwardly from the exterior surface of the three-dimensional lattice structure.

19. The method of claim 18, wherein forming the three-dimensional lattice structure includes forming a cavity within the three-dimensional lattice structure, and wherein coupling the element comprises inserting the element into the cavity of the three-dimensional lattice structure.

20. The method of claim 18, wherein forming the three-dimensional lattice structure includes forming a plurality of slots in the three-dimensional lattice structure, wherein each one of the plurality of slots extends from the first end to the second end of the three-dimensional lattice structure; and wherein providing the element includes forming a plurality of inserts, using the additive manufacturing technique, and coupling the element includes depositing the plurality of inserts into a respective one of the plurality of slots.

21. The flame arrestor of claim 1, wherein the element extends from the first end of the body to the second end of the body.

22. The flame arrestor of claim 1, wherein the exterior surface of the body provides a walled enclosure to the plurality of channels.

* * * * *

UNITED STATES PATENT AND TRADEMARK OFFICE
CERTIFICATE OF CORRECTION

PATENT NO. : 9,987,508 B2  
APPLICATION NO. : 15/253537  
DATED : June 5, 2018  
INVENTOR(S) : John D. Cockerham et al.

Page 1 of 1

It is certified that error appears in the above-identified patent and that said Letters Patent is hereby corrected as shown below:

On the Title Page

Item [*], "Notice," Line 3, "0 days. days." should read -- 0 days. --.

In the Specification

Column 1, Lines 45-46, "housing 104" should read -- housing 108 --.

Column 1, Line 58, "flamer" should read -- flame --.

Column 6, Lines 30-31, "an hexagonal" should read -- a hexagonal --.

Column 7, Line 20, "flow path 400" should read -- flow path 424 --.

Signed and Sealed this
Second Day of July, 2019

Andrei Iancu
*Director of the United States Patent and Trademark Office*